United States Patent
Nieuwejaar et al.

(10) Patent No.: US 8,875,159 B1
(45) Date of Patent: Oct. 28, 2014

(54) SYSTEM FOR DEFINING NON-NATIVE OPERATING ENVIRONMENTS

(75) Inventors: Nils A. Nieuwejaar, Santa Clara, CA (US); Eric N. Schrock, Santa Clara, CA (US); William J. Kucharski, Santa Clara, CA (US); Russell A. Blaine, Santa Clara, CA (US); Edward K. Pilatowicz, Santa Clara, CA (US); Adam H. Leventhal, Santa Clara, CA (US)

(73) Assignee: Oracle America, Inc., Redwood City, CA (US)

(*) Notice: Subject to any disclaimer, the term of this patent is extended or adjusted under 35 U.S.C. 154(b) by 2437 days.

(21) Appl. No.: 11/637,985

(22) Filed: Dec. 12, 2006

(51) Int. Cl.
*G06F 3/00* (2006.01)
*G06F 9/46* (2006.01)

(52) U.S. Cl.
USPC .......................... 719/319; 718/100; 718/104

(58) Field of Classification Search
CPC ... H04L 45/48; G06F 9/4555; G06F 17/2247; G06F 17/30067; G06F 17/30091; G06F 17/30961; G06F 9/545
See application file for complete search history.

(56) References Cited

U.S. PATENT DOCUMENTS

| | | | |
|---|---|---|---|
| 6,263,378 B1* | 7/2001 | Rudoff et al. | 719/327 |
| 7,665,088 B1* | 2/2010 | Bugnion et al. | 718/1 |
| 2004/0226017 A1* | 11/2004 | Leonard et al. | 718/104 |
| 2004/0226019 A1* | 11/2004 | Tucker et al. | 719/310 |
| 2004/0230331 A1* | 11/2004 | Hwang | 700/94 |
| 2006/0080522 A1* | 4/2006 | Button et al. | 713/2 |
| 2008/0155542 A1* | 6/2008 | Maigne et al. | 718/100 |

OTHER PUBLICATIONS

Nils Nieuwe-jaar, Brandx: Support for non-native zones, Aug. 11, 2005, Sun Microsystems, pp. 1-9.*
"The KaffeOS Java Runtime System", Godmar Back, Jul. 2005, pp. 1-48.*

* cited by examiner

*Primary Examiner* — Tuan Dao
(74) *Attorney, Agent, or Firm* — Marsh Fischmann & Breyfogle LLP; Kent A. Lembke

(57) ABSTRACT

Methods and systems for defining the partitioning between operating system environments are provided. In this method, network resources, devices, and pseudo-filesystems, etc. can be partitioned. This method provides the capability to support services from native and foreign operating environments without colliding on fixed resources. This method simplifies the task of supporting multiple different operating environments. By assigning each operating environment to its own zone, multiple instances of a single operating environment or multiple different operating environments can be simultaneously supported on a single operating system kernel.

13 Claims, 8 Drawing Sheets

Foreign Application Stack

Address Space Map
(not drawn to scale)

SYSTEM FOR DEFINING NON-NATIVE OPERATING ENVIRONMENTS

CROSS REFERENCE TO RELATED APPLICATIONS

The present application is related to U.S. application Ser. No. 11/637,986 entitled "Efficient Operating System Interposition Mechanism," filed on Dec. 12, 2006 and incorporated herein by reference. The present application is further related to U.S. application Ser. No. 11/637,989 entitled "Method For Defining Non-Native Operating Environments," filed on Dec. 12, 2006, and incorporated herein by reference. The present application is further related to U.S. Application Ser. No. 60/874,581 entitled "Method and System For Defining Non-Native Operating Environments," filed on the same date as the present application, and incorporated herein by reference.

BACKGROUND

1. Field of the Invention

The invention relates generally to operating system environments, and more particularly, to systems and methods for providing alternate operating environments within a single native operating environment.

2. Description of the Related Art

For a host operating system to execute an application written for a different operating system, the host operating system must provide the foreign application with the services and environment the foreign application expects. Providing these expected services and environment to a foreign application is complicated. Counter intuitively, providing services and environment to a foreign application is most complicated when the host operating system and the operating system for which the foreign application was written have substantial similarities. Such similarities can cause collisions in the placement and/or naming of resources. These collisions can include undesirable overlap in system libraries, configuration files, and network ports, etc. of the respective operating systems and, in most cases, the overlap is fatal. For example, the LINUX™ and SOLARIS™ operating systems use the same file "/etc/passwd" to store the list of users and corresponding passwords of every user on a system. However, the format of the "/etc/passwd" file in the LINUX™ operating system is different from the format of the "/etc/passwd" file in the SOLARIS™ operating system. Therefore, when a LINUX™-based application executing in a SOLARIS™ environment attempts to validate a particular user, the LINUX™-based application fails because the application does not know how to process the format of the data contained in the SOLARIS™ "/etc/passwd" file.

Conventionally, one solution for allowing a host operating system to execute an application written for a different operating system and avoiding collisions like those discussed above involves file system namespace partitioning. File system namespace partitioning provides a separation between host (native) and foreign (non-native) operating system environments. Two general approaches are normally used to perform file system namespace partitioning, namely the "chroot" (change root) operation and path mapping mechanisms. Change root ("chroot") is a standard UNIX™ etc. operation for restricting a process' view of a full file system to a limited sub-tree within the file system. For example, the "chroot" operation can set the "root directory" of a restricted process to a given path that is located at a subdirectory (e.g. "/compat") below a real root directory ("/") which is located at the topmost directory in the hierarchy of the underlying file system, as illustrated in Table A below:

TABLE A

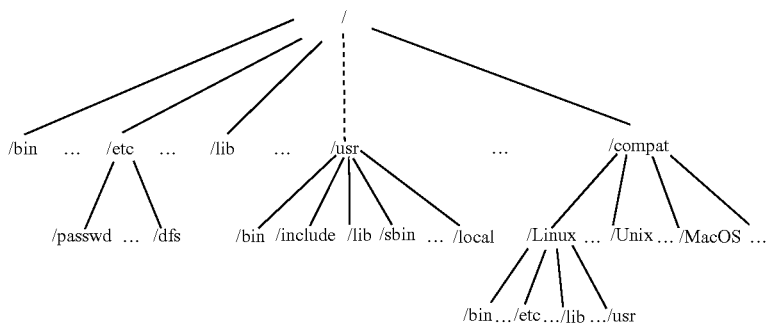

By designating a node within the host file system hierarchy to be the "root" node visible to the restricted process (e.g. "/compat" in Table A), all path translations are performed relative to the new root node. This approach has been used to prevent a foreign application running in a host environment from accidentally referring to the files belonging to the native operating system. However, there is frequently collision-free data located within the host's file system hierarchy that a restricted process may want or need to access. And since this data exists outside the limited universe created by "chroot," the restricted process will not have access to the data located in host's file system hierarchy.

Path mapping is a more complex approach to solving the collision problems caused by similarities between the operating system for which a foreign application was written and the native operating system hosting the foreign application. Unlike "chroot," which causes all path translations to be defined relative to a new root node, path mapping affects only a subset of all translations. In other words, path mapping allows an operating system to remap requests for operating system files (e.g., libraries, configuration files, etc.) while allowing requests for user data files to be passed through to the native operating system kernel without modification.

Typically, in path mapping, collisions between the foreign operating system and the host operating system are identified in advance, and a directory (within the host file system) is provided that includes any directories and/or files associated with the foreign operating system that conflict with corresponding files or directories of the host operating system. During execution of the foreign application, the host operating system intercepts references made by the foreign application to a conflicting directory or file, and transparently remaps the reference to a corresponding directory or file in the directory of conflicting foreign directories and/or files. For example, if a Linux™ application executing on a Solaris™ operating system tried to open the file "/etc/passwd," the open call would be intercepted and "/etc/passwd" would be transparently remapped to "/compat/Linux/etc/passwd." Unfortunately, the path mapping approach discussed above does not work efficiently when entire directories are being remapped. The path mapping approach is also fragile. More particularly, the path mapping approach requires a host operating system to know in advance which files and directories will need to be remapped. The slightest change in the file naming used by the foreign operating system can completely break the path mapping mechanism. Another complication is that operating systems (e.g. UNIX™, Solaris™, etc.) usually maintain a notion of where a process is (i.e. its current location within a host file namespace hierarchy) so that when a command like "pwd" (print working directory) is used, what is returned is an exact location of the process with respect to the file system namespace hierarchy. And if a process changes directory ("cd") to "/foo" and the "/foo" directory has been remapped to "/compat/Linux/foo" everything is fine. However, if a process then calls "pwd" after changing the directory to "/foo" the process expects to get back "/foo." Unfortunately, the process is actually in the "/compat/Linux/foo" directory and "/compat/Linux/foo" will be returned from the "pwd" call unless a reverse mapping is transparently carried out from "/compat/Linux/foo" back to "/foo." A significant amount of overhead is required to perform this type of mapping and reverse mapping. Moreover, the path mapping approach becomes untenably complicated when mixing the usage of native and foreign applications. Since native and foreign applications have different views of the host file system and their places within it, they cannot sensibly communicate about file-related data. For example, it is difficult for a native web browser to invoke a foreign utility to display a data file. Path mapping and "chroot ( )" techniques are also both limited to virtualizing the file system namespace. The primary focus of both techniques is on preventing foreign processes from accidentally accessing native files.

Another solution for allowing a host operating system to execute an application written for a different operating system involves "full system virtualization." Full system virtualization provides a capability to execute a complete instance of an operating system within a virtual machine on top of a different operating system. For example VMWARE™, XEN™, VIRTUALPC™, and PARALLELS™ all provide full system virtualization. PARALLELS™ provides a capability for executing SOLARIS™ applications on top of MACOS X™ operating systems, VMWARE™ provides a capability for executing WINDOWS™ applications on top of LINUX™ operating systems, and so on. Full system virtualization involves virtualization at the hardware level of a computer system. Therefore, the operating systems being virtualized must be fully installed on the host computer system, including the operating system's kernel. This full-system approach requires hundreds of megabytes of memory to accommodate the virtualized operating system as well as approximately one megabyte of memory for each corresponding application. Moreover, because of such considerable resource requirements, only a few applications can be executed.

In view of the forgoing, there is a need to separate the environments of native and foreign operating systems in a manner that allows interoperability while avoiding resource collisions and unnecessary overhead.

SUMMARY

In one embodiment, the present invention provides a computer system for supporting multiple different operating environments. The computer system comprises a local zone configured within a user-space of a native operating system environment. The computer system also comprises a foreign process written for an operating system environment, wherein the operating system environment is different from the native operating system environment, and wherein the foreign process is capable of executing on the native operating system environment from within the local zone.

In another embodiment, the present invention provides a system for handling system calls between multiple different operating system environments. The system comprises a handler module included in a kernel associated with a native operating system environment. The handler module is capable of receiving a system call from a foreign process or a native process and determining whether the system call is from the foreign process or the native process. The foreign process is written for an operating system environment that is different from the native operating system environment and the native process is written for the native operating system environment. The system further comprises an emulation library associated with the foreign process, wherein the emulation library is capable of transforming the system call into a system call recognized by the kernel and the emulation library is capable of passing the system call recognized by the kernel to the kernel. The system also comprises a brand kernel module associated with the kernel, wherein if the system call is received from the foreign process and the system call requires emulation, the handler module is capable of transferring control to the brand kernel module, wherein the brand kernel module is capable of invoking the emulation library.

In yet another embodiment, the present invention provides a system for delivering signals between multiple different operating system environments. The system comprises a first foreign process, wherein the first foreign process is capable of generating a first signal and translating the first signal into a second signal, wherein the first signal is recognized by a foreign operating system, and wherein the second signal is recognized by the native operating system. The system also comprises a second foreign process, wherein the second foreign process is capable of receiving the second signal, translating the second signal into a third signal, and sending the third signal to a signal handler module associated with the second foreign process, wherein the third signal is recognized by the foreign operating system.

In yet another embodiment, the present invention provides a computer-readable medium for directing a computer system to support multiple different operating environments. The computer-readable medium comprising instructions for configuring a local zone within a user-space of a native operating system environment. The computer-readable medium also comprising instructions for executing a foreign process on the native operating system environment from within the local zone, wherein the foreign process is written for an operating system environment that is different from the native operating system environment.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Figure 1:
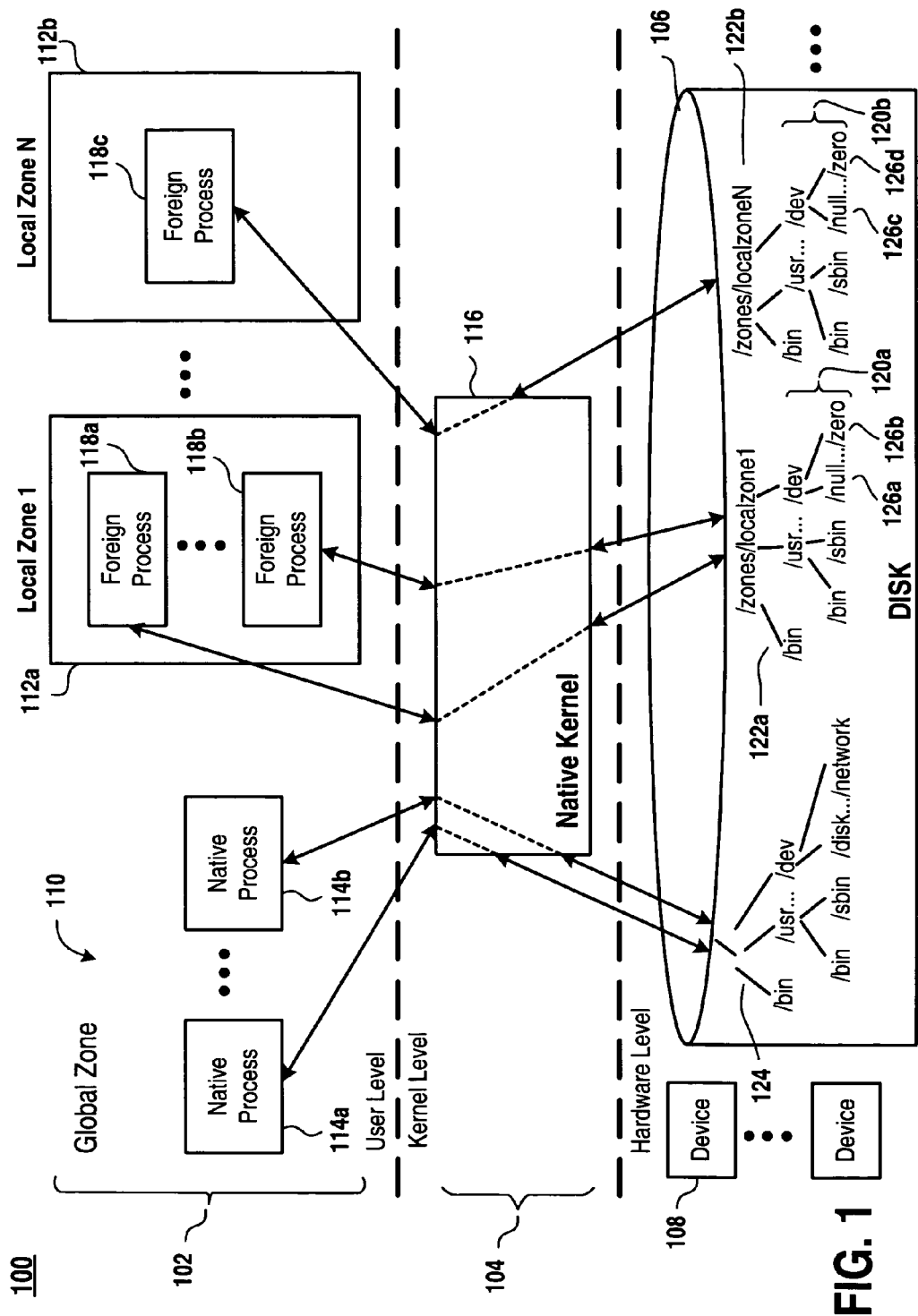
FIG. 1 is an illustration of a system for supporting multiple different operating environments, in accordance with an embodiment of the present invention.

Embodiments of the present invention provide a "branded zone" approach for partitioning resources between the user-space environments of different operating systems. More particularly, according to embodiments of the present invention, a foreign application can be launched within an isolated "local zone" of a native operating system environment that is different from the operating system environment the foreign application was written for. The local zone can be assigned a "brand type" that is used to configure the local zone. All file, device, and network resources available to foreign applications are placed into well-known locations, defined by the configuration of the local zone. When foreign applications are launched, the foreign applications are run strictly within the context of the local zone, allowing the flexibility to completely emulate the foreign application's expected environment without any modifications to the environment experienced by native applications. The "branded zone" approach provided by embodiments of the present invention provides a capability to partition between disparate operating system environments in a more consistent and systematic manner. Rather than simply partitioning a file system name space, it is possible to partition network resources, devices, pseudo-file systems, and so on. This approach provides a capability to support services from both native and foreign operating system environments without colliding on fixed resources, such as network ports, etc. In other words, by assigning each operating environment to its own "local zone," multiple instances of a single host operating environment or multiple different operating environments can be supported simultaneously and easily.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. The present invention includes several aspects and is presented below and discussed in connection with the Figures and embodiments.

According to embodiments of the present invention, as discussed below, the process of emulating the expected environment of a foreign process can involve several considerations including the availability of foreign process system configuration information and the accessibility of physical devices to foreign applications; the handling of system calls between a foreign process and a native operating system; the handling and processing of signals between the foreign process and the native operating system; and the partitioning of pseudo filesystems between native and foreign environments. Certain implementation details discussed below can also be considered such as configuring local zones; loading foreign applications into native operating system environments; and identifying "interposition points" that reflect the differences between native and foreign operating system environments. The specifics of such implementation details are, exemplary and are not meant to limit the scope of the present invention. These considerations and implementations will sometimes be illustrated in the context of a LINUX™ application (or process) executing in LINUX™ branded local zones on a SOLARIS™ kernel. However, such illustrative discussions are not meant to limit the scope of embodiments of the present invention. In fact, it is important to note that embodiments of the present invention provide an approach for supporting multiple instances of any single operating system or multiple different operating environments simultaneously. Such operating systems and environments can include any combination of SOLARIS™-based, UNIX™-based, MACOS™-based, LINUX™-based, WINDOWS™-based operating systems and applications, or any other combination of operating systems and applications. Also, for purposes of embodiments of the present invention, the terms "process" and "application" are used interchangeably.

In FIG. 1, in one embodiment of the present invention, is an illustration of a system 100 for supporting multiple different operating environments within a single native operating system environment. At a user level, the system 100 includes a user-space infrastructure 102 and at a kernel level the system 100 includes a kernel infrastructure 104. At a hardware level, the system 100 includes underlying hardware, including but not limited to disks 106, network devices 108, etc.

The user-space infrastructure 102 includes a global zone 110 and one or more local zones 112a, 112b which are located within the global zone 110. In one embodiment of the present invention, the global zone 110 is a user-space area that includes all of the system's 100 resources. The global zone 110 is responsible for creating and destroying local zones 112, assigning subsets of the system's 100 resources to the local zones 112, and monitoring the behavior of the local zones 112. Additionally, the global zone 110 has visibility into the one or more local zones 112. However, the local zones 112 do not have visibility into the global zone 110. The global zone 110 can include one or more "native processes" 114a, 114b. For purposes of embodiments of the present invention, a "native process" is a binary written for the operating system associated with a native kernel 116. In one embodiment of the present invention, a native process 114 can be a SOLARIS™-based, a UNIX™-based, a LINUX™-based, MACOS™-based, a WINDOWS™-based, etc. process.

In one embodiment of the present invention, a local zone 112 is an isolated and secure environment created for the execution of one or more "foreign processes" 118a, 118b that are written for an operating system environment that is different from the operating system environment of the native kernel 116. More particularly, each local zone 112a, 112b is a collection of one or more respective "foreign processes" 118a, 118b, 118c with limited privileges, and limited device trees 120a, 120b that can be subdirectories of alternative root directories 122a, 122b. For purposes of embodiments of the present invention, a "foreign process" is a binary application written for an operating system that is different from the operating system of the native kernel 116 on which the foreign process executes. A foreign process 118 can be a LINUX™-based, a UNIX™-based, a SOLARIS™-based, a WINDOWS™-based, a MACOS™-based process, or any other process written for an operating system that is different from the native kernel operating system 116.

In one embodiment of the present invention, as mentioned above, each local zone 112 can be provided with a limited device tree 120a, 120b. The limited device tree 120a, 120b can prevent a foreign application 118 from corrupting or gaining access to the native operating system's 116 kernel memory, file systems, etc. and makes it easier to control which devices 108 are accessible to particular foreign applications 118. For example, a Linux™-based local zone device tree 120 can be provided to support "/dev/null," "/dev/zero," "/dev/ptmx," "/dev/pts/*" (* is a wildcard), "/dev/tty," "/dev/console," "dev/random," "/dev/urandom," "/dev/fd," Open Sound System (OSS) audio devices, etc. The content of a device tree 120a, 120b constructed for a local zone 112 can be selected by studying a device tree corresponding to a real instance of a foreign operating system and by observing which devices are actually accessed by applications executing on the foreign operating system. If a foreign application 118 attempts to access a device that is not present in the local zone device tree 120, a "device not found" error can be returned to the foreign application 118. Robust foreign applications 118 can survive the error and adopt a fallback position.

Referring still to FIG. 1, in one embodiment of the present invention, as mentioned above, each local zone 112a, 112b can be provided with an alternate root directory 122a, 122b. The alternate root directory 122a, 122b can include a full directory of the files that the foreign process 118 expects to access to during execution. Unlike conventional "chroot" or "path mapping" approaches, the alternate root directory 122a, 122b of one embodiment of the present invention is more isolated from the root directory ("/") 124 of the native kernel's 116 file system. In one embodiment of the present invention, unprivileged native processes 114 cannot see, read, or modify any files in the alternate root directory 122a, 122b structure. In one embodiment of the present invention, privileged native processes 114 can access the files in the alternate root directory 122a, 122b structure by explicitly including a path to the top level (e.g. "/zones/localzone") of the alternate root directory 122a, 122b. Moreover, in one embodiment of the present invention, foreign processes 118, whether privileged or unprivileged, cannot intentionally or accidentally see, read, or modify any files outside the alternate root directory 122a, 122b structure.

In one embodiment of the present invention a local zone 112a, 112b can be assigned a "brand type" (i.e., "brand"). This brand type is used to determine which scripts are executed when a local zone 112a, 112b is installed and booted. The brand type can also be used to properly identify the application type (e.g., LINUX™, UNIX™, SOLARIS™, etc.) associated with a particular local zone 112 at launch time. For example, in one embodiment of the present invention, each local zone 112a, 112b is associated with a brand type for configuration purposes. The default brand is a "native" brand. The native brand is created for local zones which include applications that are written for the native kernel 116. Other local zone brands include, but are not limited to, Linux ("lx"), UNIX, MacOS, Windows, Solaris, alternative-Solaris (Nexenta/ShilliX/BeleniX), Solaris tools replaced with /usr/bin with GNU equivalents, etc. brands.

The kernel infrastructure 104 of the system 100 includes a single native kernel 116. As discussed briefly below and in detail in a related application entitled "Efficient Operating System Interposition Mechanism" which is incorporated herein by reference, the native kernel includes "interposition points" that allow a foreign application 118 the capability to run on the native kernel 116 (but strictly within the context of the of a local zone 112) without any modifications to or collisions with the environment experienced by native processes 114. Adding interposition points to the native kernel infrastructure 104 allows the capability to collectively identify each of the operating system services that are different between the operating system for which a foreign application 118 is written and the native operating system 116 hosting the foreign application 118. These interposition points allow the native operating system kernel 116 to emulate the operating system environment behavior expected by the foreign application 118 without the foreign application 118 having any knowledge that it is running in a foreign environment. This emulation is performed by allowing a brand to replace or modify basic native kernel 116 behaviors. As also discussed in detail below in FIGS. 3-4, the native kernel 116 includes capabilities for handling system calls and signals issued from a foreign application 118.

Unlike conventional "full system virtualization" approaches, which provide virtualization at the hardware level, require significant memory resources etc., and require a native kernel and one or more foreign kernels, embodiments of the present invention provide virtualization at the system call level. By providing virtualization at the system call level, according to embodiments of the present invention, only a single native kernel 116 is required and individual applications execute instead of full operating systems. Additionally, only approximately one megabyte of memory is required to execute an approximately one megabyte foreign process 118. This allows the capability to host dozens or hundreds of foreign processes 118 on the single native kernel 116, each foreign process 118 executing in its own local zone 112 completely isolated from other foreign processes 118 executing in other local zones 112 and from native processes 114 executing in the global zone 110.

Additionally, unlike conventional path mapping and chroot ( ) approaches that are limited to virtualizing the file system namespace, embodiments of the present invention can provide a foreign process 118 with a virtualized device hierarchy, virtualized network ports, or a virtualized process ID (PID) number space. Embodiments of the present invention also provide a means for preventing a native process 114 from accidentally accessing the files associated with a foreign process 118.

Figure 2:
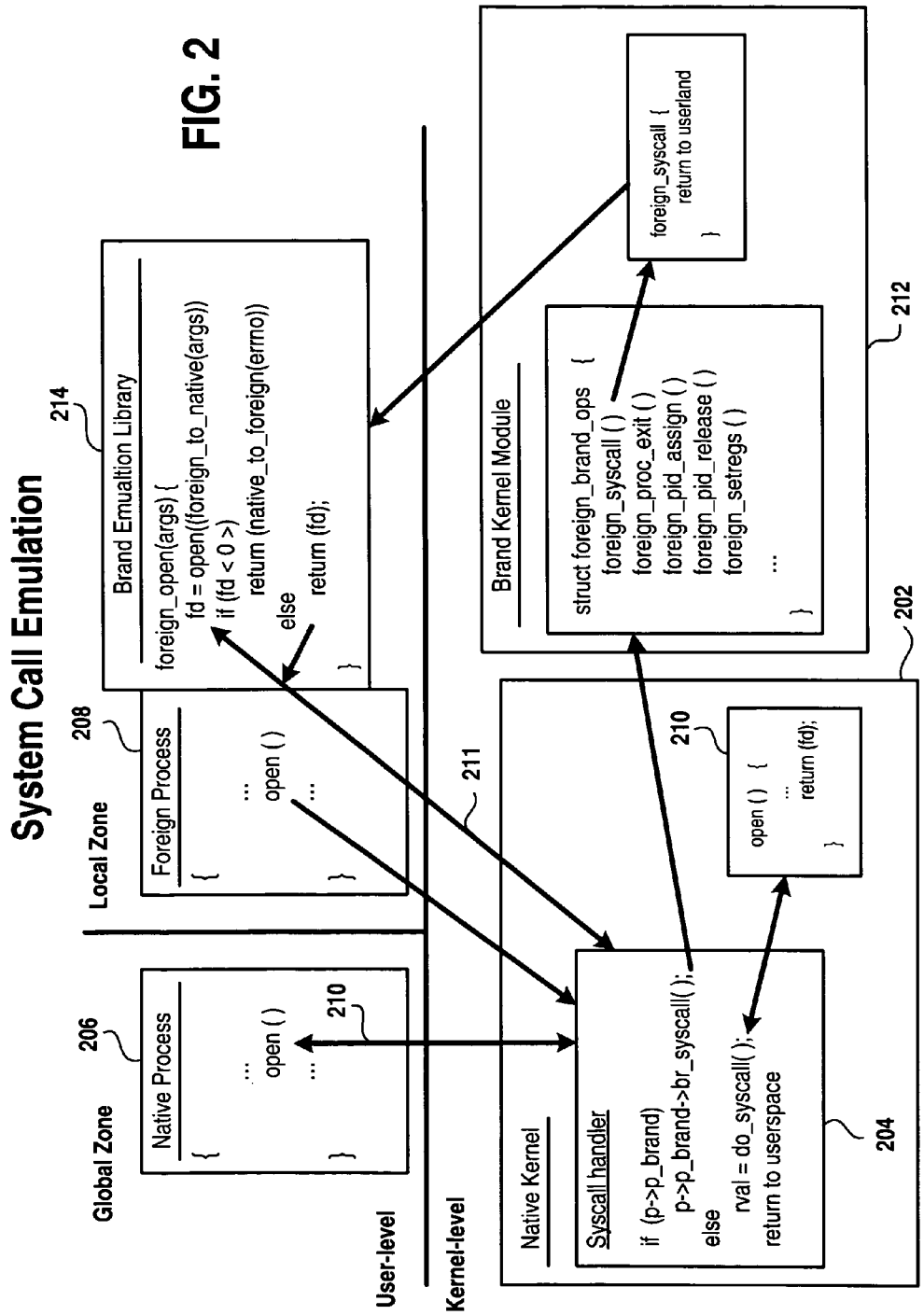
FIG. 2 is an illustration of a method for providing system call emulation, in accordance with an embodiment of the present invention.

In FIG. 2, in one embodiment of the present invention, a general illustration of a method for handling operating system services calls from both native 206 and foreign 208 processes executing on a single native kernel 202 is illustrated. The native kernel 202 includes a handler module 204 that is capable of handling system calls received from application processes 206, 208 requesting operating system services. The mechanism by which a process may issue system calls varies between computer architectures. For example, on SPARC™ machines, a system call is initiated via trap (e.g., SOLARIS™ uses traps 8 and 9). On x86 machines, there are a variety of different methods available for entering a kernel: systenter and syscall instructions, lcalls, and software-triggered interrupts. In a further example, for purposes of illustration only, to initiate a LINUX™ system call LINUX™ processes execute the "int 80" machine instruction. This machine instruction triggers a trap into the kernel at the point indicated by an $80^{th}$ value in an x86 trap vector. And because no version of SOLARIS™ makes use of the triggered trap, a new entry point can be added solely for the emulation of LINUX™ processing running on SOLARIS™.

To begin, the handler module 204 checks to see whether the process 206, 208 initiating the system service request is a native (non-branded) process 206 or a foreign (branded) process 208. Specifically, the handler module 204 checks a proc structure (the kernel's 202 representation of a process 206, 208) of the initiating process 206, 208 to determine whether the process 206, 208 belongs to a foreign brand (i.e. whether the process is a foreign process 208). If the system call originates from a native process 206, the native kernel 202 processes the system call in a conventional manner along a standard code path. Specifically, the native kernel 202 executes the system call at 210 and returns the result directly to the native process 206. If the system call originates from a foreign (branded) process 208, the kernel handler module 204 checks the proc structure of the foreign process 208 to determine whether the brand associated with the foreign process 208 has chosen to interpose on the system call entry point (see Table I-J discussion below).

Referring still to FIG. 2, if the brand does not wish to interpose on the entry point associated with a system call, control remains with the kernel handler 204 and the standard native operating system call code is executed at 210 by the native kernel 202. If the brand wishes to interpose on the entry point, control is passed from the kernel handler 204 to a brand-specific kernel module 212. A brand kernel module 212 code segment shown in FIG. 2 is exemplary and is not provided to limit the scope of embodiments of the present invention. The brand kernel module 212 then immediately "trampolines" to a user-space emulation library 214 that is located within a local zone. As discussed in more detail below in FIG. 4, each foreign process 208 loaded into a local zone has attached to it libraries that include the emulation library 214. The emulation library 214 is where the bulk of the emulation takes place. Specifically, in one embodiment of the present invention, the emulation library 214 transforms system calls initiated by the foreign process 208 into system calls recognized by the native kernel 202, including performing any necessary argument manipulation. The emulation library 214 then passes the transformed system call to the kernel handler module 204. The kernel handler module 204 receives the system call from the emulation library 214, and the native kernel 202 executes the system call at 211 and returns the results to the emulation library 214. In one embodiment of the present invention, the emulation library 214 performs any necessary manipulation of the return values and error code. The emulation library 214 then returns the manipulated return values and error code directly to the foreign application 208. The emulation library 214 does not return through the native kernel 202.

According to one embodiment of the present invention, foreign process 208 system calls can be divided into one of three emulation categories: pass-through, simple, and complex. A pass-through call is one that requires no data transformation and for which the native operating system 202 semantics match the system call of the operating system the foreign application 208 is written for. These calls can be implemented at the user level of a system by immediately calling the equivalent host operating system call. For example, the semantics of Linux™ read ( ) close ( ) write ( ) mkdir ( ) and munmap ( ) etc. system calls match Solaris™ operating system calls. For purposes of illustration only, an exemplary code segment of a Linux™ read operation that is categorized as a pass-through call is provided in Table A below:

TABLE A

```
int
lx_read (int fd, void *buf, size_t bytes
{
    int rval;
    rval = read (fd, buf, bytes);
    return (rval < 0 ? -errno : rval);
}
```

Although the arguments to the pass-through system call are identical, the method for returning an error to the caller can differ between the native operating system 202 and the operating system a foreign application 208 is written for. Therefore, the emulation library 214 corresponding to the foreign process 208 must still perform any necessary manipulation of the return values and error code. For example, the method for returning an error to a caller differs between SOLARIS™ and LINUX™. In SOLARIS™, the system call returns "−1" and the error number is stored in the thread-specific variable errno. In LINUX™, the error number is returned as part of the rval. There are also differences in the error numbers between SOLARIS™ and LINUX™. Therefore, for example, an lx_read( ) routine can be called by lx_emulate( ) which handles the translation between LINUX™ and SOLARIS™ error codes for all system calls.

A simple emulation call is one step up in complexity from pass-through system calls. The simple emulation call is a call where either the original arguments and/or return value require some degree of simple transformation from the native operating system equivalent. Simple transformations include changing data types or the moving of values into a structure. These calls can be built entirely from standard host operating system calls and user-level transformations. For purposes of illustration only, an exemplary code segment of a Linux™ "uname" operation that is categorized as a simple emulation call and is built from a Solaris™ host operating system call and user-level transformations is provided in Table B below:

TABLE B

```
int
lx_uname(uintptr_t p1)
{
    struct lx_utsname *un = (struct lx_utsname *)p1;
    char buf[LX_SYS_UTS_LN + 1];
```

TABLE B-continued

```
    strlcpy(un->sysname, LX_SYSNAME, LX_SYS_UTS_LN);
    strlcpy(un->release, lx_release,    LX_SYS_UTS_LN);
    strlcpy(un->version, LX_VERSION, LX_SYS_UTS_LN);
    strlcpy(un->machine, LX_MACHINE, LX_SYS_UTS_LN);
    gethostname(un->nodename, sizeof (un->nodename));
    if ((sysinfo(SI_SRPC_DOMAIN, buf, LX_SYS_UTS_LN) < 0))
        un->domainname[0] = '\0';
    else
        strlcpy(un->domainname, buf, LX_SYS_UTS_LN);
    return (0);
}
```

Other examples of simple emulated Linux™ calls can include stat( ), mlock ( ), and getdents ( ).

A complex emulation system call is one requiring the most in-kernel support and is a call that requires significant transformation to input arguments or return values. These calls are partially or wholly unique within a particular foreign operating system brand implementation, and possibly require a new system call that has no underlying native operating system 202 counterpart. For example, complex emulated Linux™ calls whose execution is desired in a Solaris™ operating environment include clone ( ) and futex ( ).

Using the Linux™ clone ( ) system call for purposes of illustration only, Linux™ implements threads via the clone ( ) system call. Among the arguments to the call is a set of flags, four of which determine the level of sharing within the address space: CLONE_VM, CLONE_FS, CLONE_FILES, and CLONE_SIGHAND. When all four flags are clear, the clone is equivalent to a fork; when they are all set, the clone is the equivalent to creating another thread in the address space. Any other combination of flags reflects a thread/process construct that does not match any existing Solaris™ model. Table C below lists all of the flags for the clone (2) system call, and whether the "lx" (Linux™) brand supports them. If a foreign application uses an unsupported flag, or combination of flags, a detailed error message is emitted and ENOTSUP is returned.

TABLE C

| Flag | Supported? |
|---|---|
| CLONE_VM | Yes |
| CLONE_FS | Yes |
| CLONE_FILES | Yes |
| CLONE_SIGHAND | Yes |
| CLONE_PID | Yes |
| CLONE_PTRACE | Yes |
| CLONE_PARENT | Partial. Not supported for fork( )-style clone( ) operations. |
| CLONE_THREAD | Yes |
| CLONE_SYSVSEM | Yes |
| CLONE_SETTLS | Yes |
| CLONE_PARENT_SETTID | Yes |
| CLONE_CHILD_CLEARTID | Yes |
| CLONE_DETACH | Yes |
| CLONE_CHILD_SETTID | Yes |

When an application uses clone (2) to fork a new process, the lx_clone ( ) routine simply calls fork1 (2). When an application uses clone (2) to create a new thread, the thr_create (3C) routine is called in the Solaris™ libc. The Linux™ application provides the address of a function at which the new thread should begin executing as an argument to the system call. However, the Linux™ kernel does not actually start execution at that address. Instead, the Linux™ kernel essentially does a fork (2) of a new thread which, like a forked process, starts with exactly the same state as the parent thread. As a result, the new thread starts executing in the middle of the clone (2) system call, and it is the glibc wrapper that causes it to jump to the user-specified address. This Linux™ implementation detail means that when thr_create (3C) is called to create a new thread, the user's start address cannot be provided to that routine. Instead, all new Linux™ threads begin by executing a routine that can be provided, called clone_start ( ). This clone_start routine does some final initialization, notifies the brand's kernel module 212 that created a new Linux™ thread is created, and then returns to glibc.

In Solaris™ and most other UNIX™ variants, every process has only one, process ID number (PID). A by-product of threads implementation in Linux™ is that every thread has a unique PID. To mimic this behavior in the Linux™ (lx) brand on Solaris™, every thread created by a Linux™ binary reserves a PID from the PID list. This reservation is performed as part of the clone_start ( ) routine. This reserved PID is never seen by Solaris™ processes, but it is used by Linux™ processes. When a Linux™ thread calls getpid (2), it is returned the standard Solaris™ PID of process. When it calls gettid (2), it is returned the PID that was reserved at thread creation time. Similarly, kill (2) sends a signal to the entire process represented by the supplied PID, while tkill (2) sends a signal to the specific thread represented by the supplied PID.

The Linux™ thread model supported by modern Red Hat™ systems is provided by the Native Posix Threads Library (NPTL). NPTL uses three consecutive descriptor entries in the Global Descriptor Table (GDT) to manage thread local storage. One of the arguments to the clone ( ) is an optional descriptor entry for Transport Layer Security (TLS). More commonly used is the set_thread_area ( ) system call, which takes a descriptor as an argument and returns the entry number in the GDT in which it has been stored. The NPTL then uses this to initialize the % gs register. The descriptors are per thread, so they have to be stored in per thread storage and the GDT entries must be re-initialized on context switch. This is done via a restorectx ( ) operation. Since both NPTL and the Solaris™ libc rely on % gs to access per-thread data, code can be added to virtualize its usage. As shown in Table D below, the first thing a user-space emulation library does is:

TABLE D

```
/*
 * Save the Linux libc's %gs and switch to the Solaris libc's %gs segment
so we
 * have access to the Solaris errno, etc.
 */
    pushl    %gs
    pushl    $THREADGS_SEL
    popl     %gs
```

This sequence shown in Table D can ensure that the Solaris™ code is entered using the well-known value used for % gs. The current value of % gs is also remembered on the stack, so it can be restored prior to returning to Linux™ code.

Another aspect of virtualizing at the system call interface can occur in the case where a user-space emulation library 214 accesses an argument from a system call which has an invalid address. Continuing with the exemplary scenario of a Linux™ application process executing in a Solaris™ operating environment, if the user-space emulation library 214 were to access an argument from a system call which had an invalid address, a SIGSEGV signal would be generated. For proper Linux™ emulation, the desired result in this situation is to generate an error return from the system call with an EFAULT errno. To deliver the expected behavior, a new system call (uucopy ( )) can be introduced, which copies data from one user address to another. Therefore, any attempt to use an illegal address will cause the call to return an error. Otherwise, the data will be copied as if we had performed a standard bcopy ( ) operation. An exemplary code segment is provided in Table E below:

TABLE E

```
int
lx_system_call(int *arg)
{
   int   local_arg;
   int   rval;
   /*
    * catch EFAULT
    */
   if ((rval = uucopy(arg, &local_arg, sizeof (int))) < 0)
      return (rval);                  /* errno is set to EFAULT */
   /*
    * transform the arg, now in local_arg, to Solaris format
    */
   return (solaris_system_call(&local_arg));
}
```

Figure 3A:
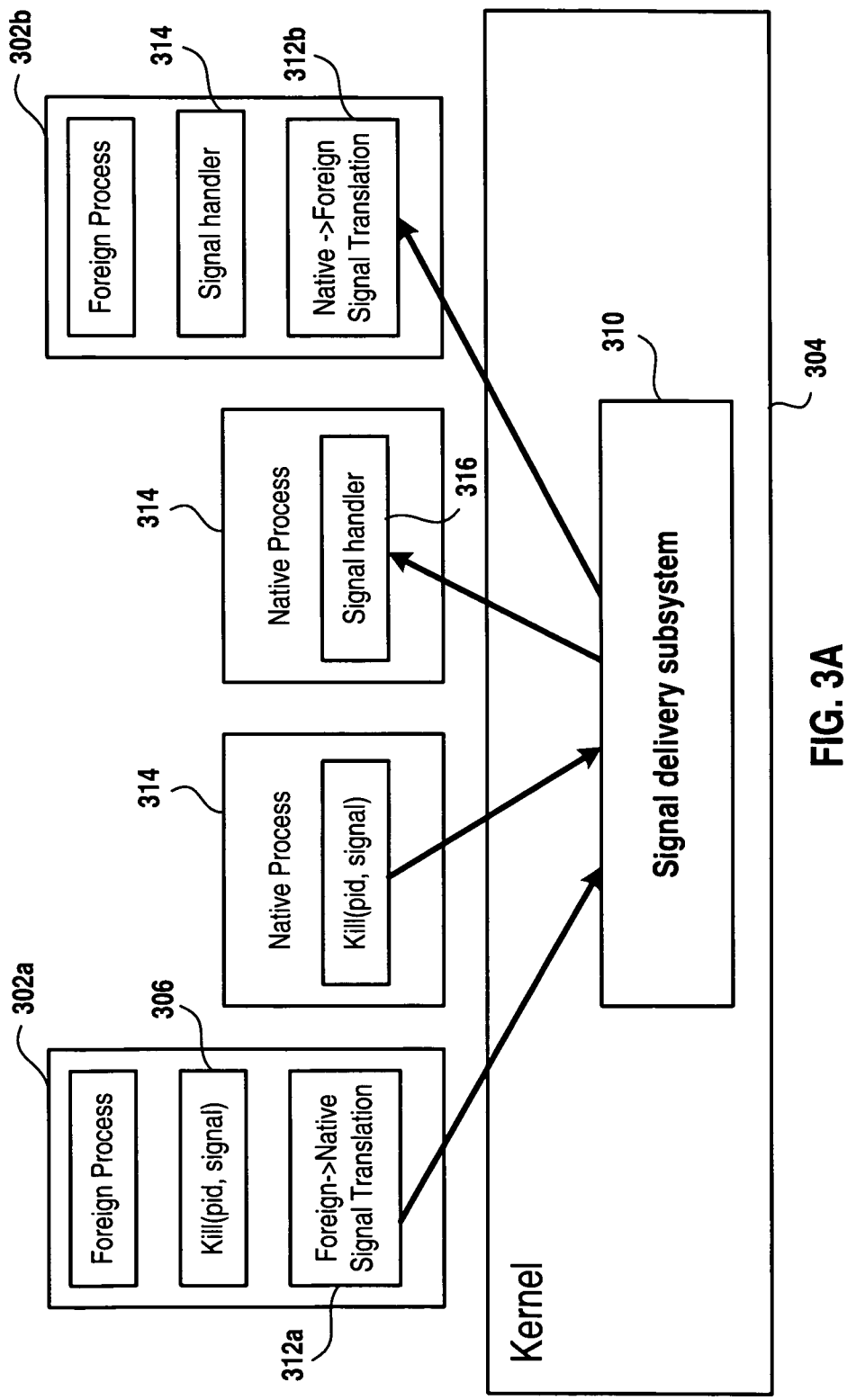
FIG. 3A is an illustration of a method for providing signal delivery mechanisms, in accordance with an embodiment of the present invention.
Figure 3B:
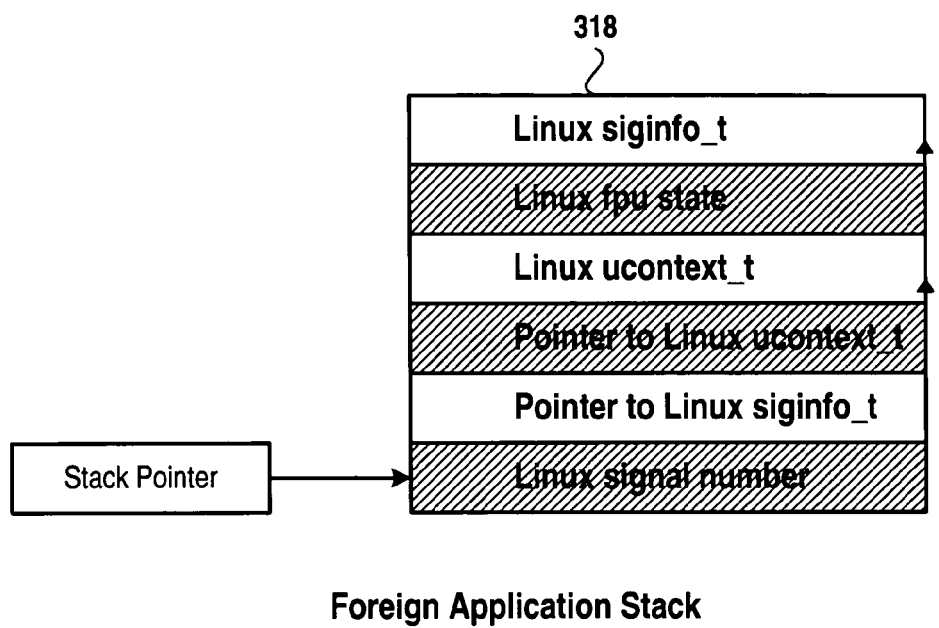
FIG. 3B is an illustration of a foreign application stack generated from the signal delivery system method of FIG. 3A, in accordance with an embodiment of the present invention.

Turning now to FIGS. 3A and 3B, according to embodiments of the present invention, a method is shown for delivering signals between foreign process 302a, 302b and a native kernel 304 where the foreign processes 302a, 302b are written for an operating system that is different from the native operating system 304 hosting the foreign processes 302a, 302b. Delivering signals between foreign processes 302 and a native operating system kernel 304 can be complicated. Such complications can result from the differences in signal numbering, stack structure and content, and the action 30 taken when a signal handler exits. In addition, many signal-related structures vary between the foreign operating system and the native operating system. For example, many signal-related structures, such as sigset_$_t$, vary between Solaris™ and Linux™.

In FIG. 3A, in one embodiment of the present invention, signals delivered between a foreign process 302a, 302b and a native operating system 304 are translated in both directions, ensuring that the native operating system kernel 304 does not handle or process un-translated signals. Specifically, when a foreign process 302a sends a signal using a system call at 306 (e.g. "kill (2)"), the signal is translated as part of the emulation of the system call at 312a into a native kernel 304 equivalent before handing control off to a standard signal delivery subsystem 310 of the native kernel 304. Similarly, when a signal is delivered from the signal delivery subsystem 310 to a foreign process 302b, a brand signal handler 312b translates the native operating system signal number and signal information structure (e.g. siginfo_t) to signal numbers and structures that are recognized by the foreign process' 302b operating system. The brand signal handler 312b then builds a stack identical to that which would be built by the foreign operating system. FIG. 3B illustrates an exemplary stack 318 that can be used for Linux™ applications. The brand signal handler 312b then jumps to the foreign process' signal handler 314. Although FIG. 3A illustrates foreign processes 302a, 302b as separate processes, the description provided above applies equally to cases where the a foreign process 302 issues a signal to the kernel 304 and a corresponding signal is returned to the same foreign process 302 that issued the signal. Translating signals both at generation and at delivery time ensures both that native operating system signals are properly sent to foreign applications 302 and that signals' default behavior works as expected. It is important to note that the signal translation approach of embodiments of the present invention is equally applicable to any foreign application executing on any native operating system kernel environment. Finally, in FIG. 3A, when signals are exchanged between a native process 314 and the signal delivery subsystem 310 of the native kernel 314, the signals are handled directly by a signal handler 316 associated with the native process 314 without any requirement for translation.

In one embodiment of the present invention, a method for setting the context of a foreign process 302b that is interrupted for purposes of handling a signal received from a the native operating system 304 is provided. As discussed above in FIG. 3A, the signal handler 314 of a foreign process 302b is invoked upon receipt of a signal from the operating system kernel 304. Typically, when a process' signal handler 314 is invoked, the current user context is saved and a new context is created by the operating system kernel and stored in a context structure. Therefore, when the user signal handler 314 is eventually called, the stack can resemble a stack conceptually similar to the Linux™ process stack 318 shown in FIG. 3B. Typically, when the calling process leaves its signal handler the state of the application process is restored from the new context created by the operating system kernel. However, the process of returning to an interrupted thread of execution from a user signal handler can be entirely different between a host operating system and the operating the foreign application was written for. For example, for purposes of illustration only, such a difference exists between the Solaris™ and the Linux™ operating systems. While Solaris™ generally expects to set the context to the interrupted one on a normal return from a signal handler, in the normal case Linux™ instead sets the return address from the signal handler to point to code that calls one of two specific Linux™ system calls, sigreturn (2) or rt_sigreturn (2). Thus, in one embodiment of the present invention, when a Linux™ signal handler completes execution, instead of returning through what would, in Solaris™' 1 ibc be a call to setcontext (2), the Linux sigreturn (2) or rt_sigreturn (2) system calls are responsible for accomplishing much the same thing. This trampoline code (for a call to sigreturn (2)) can look like the exemplary code segment shown in Table F below:

TABLE F

| pop | %eax |
| mov | LX_SYS_sigreturn, %eax |
| int | $0x80 |

In one embodiment of the present invention, the Linux™ sigreturn (2) (or rt_sigreturn (2)) system call is intercepted in order to turn it into a return through the libc call stack that Solaris™ expects. This is done by the lx_sigreturn ( ) or lx_rt_sigreturn ( ) routines, which remove the Linux™ signal frame from the stack and pass the resulting stack pointer to another routine, lx_sigreturn_tolibc( ), which makes libc believe the user signal handler it had called returned. When control then returns to libc's call_user_handler( ) routine, a setcontext(2) will be done that (in most cases) returns the thread executing the code back to the location originally interrupted by receipt of the signal.

Regarding the partitioning of pseudo file systems between native and foreign operating system environments, some operating systems (e.g. Linux™ and Solaris™) provide pseudo file systems mounted at "/proc," allowing applications to probe and modify the state, behavior, and structure of processes running on a computer system. Although a pseudo file system can share a top-level name and a common purpose across different operating systems, the naming of the files within the file system, and the contents of the files, can be radically different. This conflict is similar to the "/etc/passed" conflict described above, but the conflict can affect an entire file system rather than only a single file. In one embodiment of the present invention, a subset of a foreign process' "/proc" functionality can be supported for corresponding foreign applications. For example, Linux™ "/proc/<PID>/*," "/proc/meminfo," "/proc/mount," "/proc/stat," and "/proc/uptime" can be supported. In one embodiment of the present invention, a foreign application's "/proc" can be implemented as a new file system. Although, the /proc available in a local zone can provide standard foreign operating system semantics, the emulation library 214 (see FIG. 2) needs some process information that is only available through the native operating system version of "/proc," which must be mounted in a different location. By mounting the native operating system "/proc" at a different location within the local zone, the information in the file system is made available to the emulation library 214, but foreign applications will not accidentally access the native operating system "/proc" file system expecting to get foreign operating system "/proc" semantics.

Regarding implementation details, according to other embodiments of the present invention, one implementation detail involves configuring a local zone. In particular, once a local zone has been assigned a brand the local zone can be configured. In one embodiment of the present invention, each brand can deliver a configuration file at "/usr/lib/brand/<brand name>/config.xml." This XML (Extensible Markup Language) configuration file is referred to from within the global zone and resides in the filesystem directory 124 (see FIG. 1) of a native operating system. The configuration file can describe how to install, configure, and boot the local zone and can also identify the name of the brand kernel module 212 (see FIG. 2) that provides kernel-level functionality for branded local zones. Table G below provides, for purposes of illustration only, an exemplary Linux™ brand configuration file code segment:

TABLE G

<!DOCTYPE brand PUBLIC "-//< >//DTD Brands//EN"
    "file:///usr/share/lib/xml/dtd/brand.dtd.1">
<brand name="lx">
    <install>/usr/lib/brand/lx/lx_install %z %R %*</install>
    <boot>/usr/lib/brand/lx/lx_boot %R %z</boot>
    <halt>/usr/lib/brand/lx/lx_halt %z</halt>
    <postclone>/usr/bin/true</postclone>
    <modname>lx_brand</modname>
    <initname>/sbin/init</initname>
</brand>

The "install" element illustrated in Table G identifies the program used to install the foreign software into a local zone. The "boot" and "halt" elements respectively identify the programs that should be run prior to booting or halting the local zone. The "postclone" element identifies the program responsible for performing any reconfiguration that needs to be done when one local zone is cloned from another. The "modname" element identifies the name of the kernel module associated with the brand. And the "initname" identifies the initial program that should be run within the local zone when it is first booted.

In another embodiment of the present invention, each brand can also deliver a platform definition file at /usr/lib/brand/<brand name>/platform.xml." This platform definition file is also referred to from the global zone and resides in the filesystem directory 124 (see FIG. 1). The platform definition file, in one embodiment of the present invention, controls the mounting of internal filesystems associated with a local zone and creates device nodes 126 (see FIG. 1) within a local zone. Specifically, the platform definition file defines which native operating system specific mounts need to be defined for each brand. In one embodiment of the present invention, a brand can require specific files or filesystems to be made visible at specific locations within the local zone. This mounting is typically done using the "mount" command from within the local zone once it is executing. However, in one embodiment of the present invention, there are file systems (such as the file system that includes the "mount" command itself) that must be available before the local zone is able to boot. The platform definition file identifies these file systems and the locations where they should be mounted. The platform definition file identifies which physical devices 108 (see FIG. 1) from the global zone should be made visible within the local zone, and which pseudo devices unique to the local zone should be created. Additionally, the platform definition file identifies how each of the physical or pseudo devices should be named. Table H below provides, for purposes of illustration only, an exemplary Linux™ XML platform definition file code segment:

TABLE H

<!-- Devices to create under /dev -->
    <device match="pts/*" />
    <device match="ptmx" />
    <device match="random" />
    <device match="urandom" />
    <device match="zero" />
    <device match="null" />
    <device match="tty" />
    <device match="tcp" />
    <device match="tcp6" />
    <device match="udp" >
    <device match="udp6" />
<!-- Symlinks to create under /dev -->
    <symlink source="stderr" target=" ./fd/2" />
    <symlink source="stdin" target=" ./fd/0" />
    <symlink source="stdout" target=" ./fd/1" />
    <symlink source="systty" target=" zconsole" />
    <symlink source="log" target=" /var/run/syslog" />
<!-- Renamed devices to create under /dev -->
    <device match="brand/lx/ptmx_linux" name="ptmx" />
<!--
    /dev/console can't be a symlink because this breaks
    login security checks via /dev/security
-->
    <device match="zconsole" name="console" />

In addition to the XML configuration file, the XML platform definition file, the kernel brand module 212 (see FIG. 2), and the scripts used to install a local zone, each brand can also deliver the following: scripts that can be invoked at boot and shutdown; linker libraries that can be used to help debug foreign applications executing within a local zone; and user-level emulation libraries 214 (see FIG. 2).

Figure 4A:
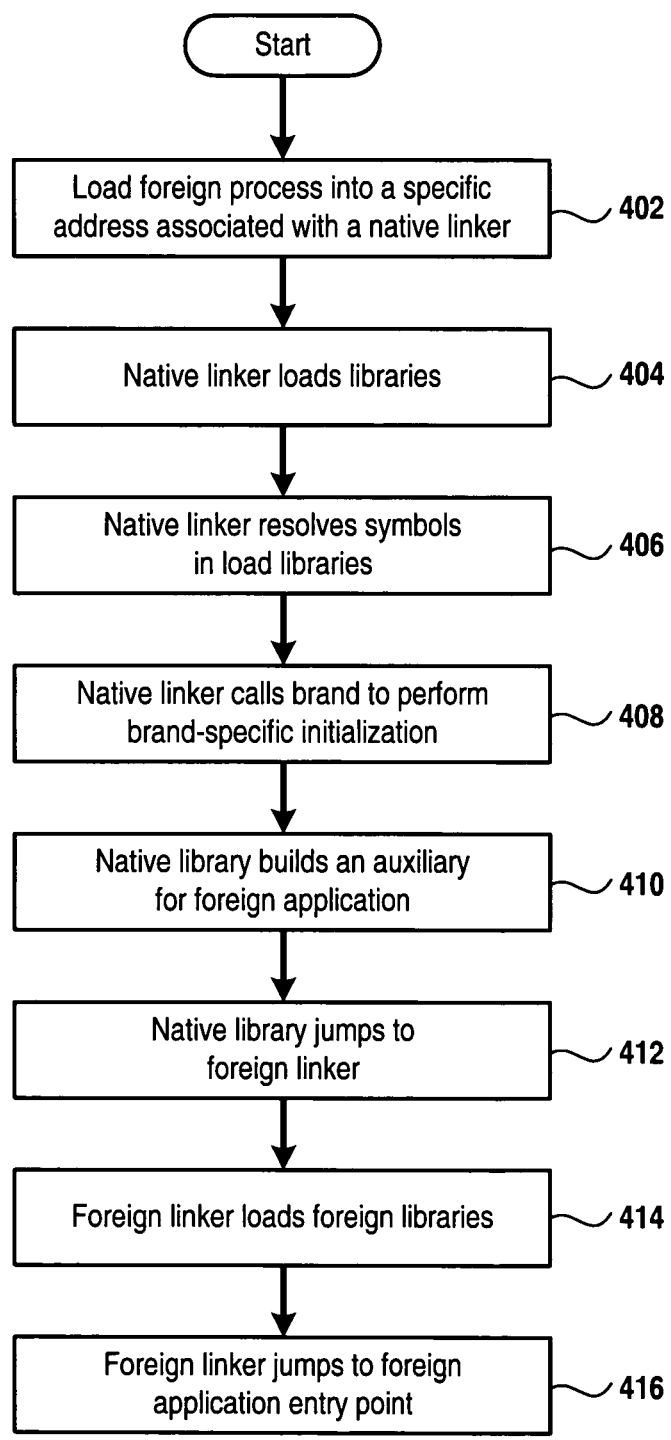
FIG. 4A is a flow chart illustrating a method for loading a foreign process into memory for execution in a native operating system environment, in accordance with an embodiment of the present invention.
Figure 4B:
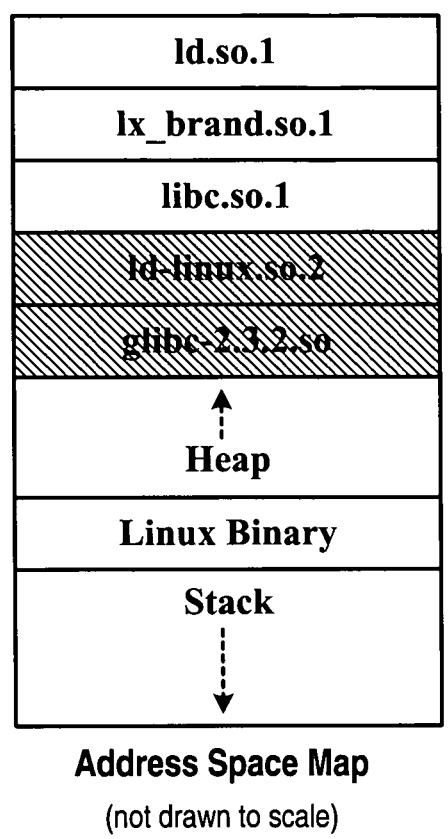
FIG. 4B is an illustration of an address space map generated from the loading method of FIG. 4A, in accordance with an embodiment of the present invention.

Another implementation detail involving loading a foreign process into memory is illustrated in FIGS. 4A and 4B, according to one embodiment of the present invention. Conventionally, when starting a software application for the first time a processor responsible for executing the application is transitioned from kernel mode to user mode. In user mode, unlike kernel mode, an application is executed without privileged access to the processor instructions, registers, memory, etc. Once the processor is transitioned to user mode, the application process is loaded into memory at a specific address located within a "linker" and process begins execution at the specific address. FIG. 4A demonstrates the case in which a foreign application process is loaded into a specific address of a "linker" associated with a native operating system, and the foreign process is executed. Specifically, in an initial step 402, the foreign process is loaded into a specific address associated with a native "linker." Thus, similar to a native application, the foreign application begins in the native linker. In step 404, the native linker loads an emulation library 214 (see FIG. 2) and any remaining system support libraries identified by the emulation library 214 (see FIG. 2). As discussed in detail in FIG. 2, the emulation library 214 (see FIG. 2) is a brand-specific library responsible for the bulk of the emulation of a foreign operating system. In step 406, the native linker resolves symbols in the libraries loaded in step 404. At step 408, the native linker calls an "init ( )" routine in a brand support library allowing the brand to perform any final brand-specific initialization necessary before passing control to the foreign application for the first time. At step 410, a native library builds an auxiliary (aux) vector for the foreign application, thus preserving the illusion that the application is being initialized by a foreign operating system kernel rather than a native library. At step 412, the native library jumps to a foreign linker, at the same address the foreign kernel would have jumped to in a real foreign operating system environment. At step 414, the foreign linker loads the foreign libraries that the foreign application identifies as necessary and the foreign linker resolves the foreign symbols in the foreign libraries. At step 416, the native kernel jumps to the foreign application entry point (e.g. "main ( )"). FIG. 4B illustrates a map of the address space comprising the user space foreign process that results from steps outlined above in FIG. 4A.

An additional implementation detail involves identifying "interposition points" that reflect the differences between native and foreign operating system environments. Because the system call invocation mechanism is an implementation detail of both an operating system and the underlying hardware architecture, in one embodiment of the present invention, interposition points are identified by a pair of "operation vectors" (one generic and one platform-specific) similar to those used by VFS (Virtual File System) for file systems and the VM (Virtual Machine) subsystem for segments. In Table I is an exemplary code segment of a generic ops vector that identifies interposition points corresponding to the system service operations that are different between a Linux operating system and a Solaris™ operating system:

TABLE I

```
struct brand_ops {
    int     (*b_brandsys)(int, int64_t *, uintptr_t, uintptr_t,
            uintptr_t, uintptr_t, uintptr_t, uintptr_t);
    void    (*b_setbrand)(struct proc *);
    void    (*b_copyprocdata)(struct proc *, struct proc *);
    void    (*b_proc_exit)(struct proc *, kthread_t *);
    void    (*b_exec)( );
    void    (*b_thread_setrval)(kthread_t *, int, int);
    int     (*b_initthread)(kthread_t *);
    void    (*b_forkthread)(kthread_t *, kthread_t *);
    void    (*b_freethread)(kthread_t *);
    void    (*b_threadexit)(kthread_t *);
    int     (*b_elfexec)(struct vnode *vp, struct execa *uap,
            struct uarg *args, struct intpdata *idata, int level,
            long *execsz, int setid, caddr_t exec_file,
            struct cred *cred);
};
}
```

A brief description of each entry follows: b_brandsys is a routine that implements a per-brand 'brandsys' system call that can be used for any brand-specific functionality; b_setbrand is used to associate a new brand type with a process. This is called when the zone's init process is hand-crafted, or when a process uses zone_enter( ) to enter a branded zone; b_copy_procdata copies per-process brand data at fork time; b_proc_exit is called at process exit time to free any brand-specific process state; b_exec is called at process exec time to initialize any brand-specific process state; b_thread_setrval set the syscall( ) return value for the newly created thread before the creating fork( ) system call returns; b_initthread is called by thread_create ( ) to initialize any brand-specific per-thread data; b_forkthread is called by forkthread ( ) to copy any brand-specific per-thread data from the parent to child threads; b_freethread is called by thread_create ( ) on error to do any brand-specific cleanup; b_threadexit is called by thread_exit ( ) to do any brand-specific cleanup; b_elfexec is called to load a branded executable.

In Table J below is an exemplary code segment for an x86 platform-specific ops vector:

TABLE J

```
struct brand_mach_ops {
    void    (*b_sysenter)(void);
    void    (*b_int80)(void);
    void    (*b_int91)(void);
    void    (*b_syscall)(void);
    void    (*b_syscall32)(void);
    greg_t  (*b_fixsegreg)(greg_t, model_t);
};
```

The first 5 entries of this x86 ops vector allow a brand to override the standard system call paths with their own interpretations. The final entry protects the Solaris operating system from brands that make different use of the segment registers in userspace, and vice-versa. The int80 entry of the x86 vector can be used for a Linux ("lx") brand.

In Table K below is an exemplary code segment for a SPARC™ platform-specific ops vector:

TABLE K

```
struct brand_mach_ops {
    void    (*b_syscall)(void);
    void    (*b_fasttrap)(void);
};
```

In view of the discussion above, it should be apparent that the embodiments of the present invention provide a capability to define the partitioning between operating environments in a more consistent and systematic manner. Rather than simply partitioning the file space, network resources, devices, pseudo-file systems, and so on can be partitioned. This approach allows the capability to support services from both native and foreign operating environments without colliding on fixed resources, such as network ports. Moreover, embodiments of the present invention simplify the task of supporting multiple different operating environments. By assigning each operating environment to its own zone, multiple instances of a single operating system or multiple different operating environments can be supported simultaneously.

Additionally, embodiments of the present invention can reduce "barriers to exit" for customers wishing to transition to another operating system platform. These customers can transition to the new environment and bring along any legacy applications from the old operating system environment. Also, developers of foreign applications can exploit the development tools and enterprise-class features of particular host operating systems without having to re-write software applications written for an operating system environment that does not support certain development tools and enterprise-class features.

Figure 5A:
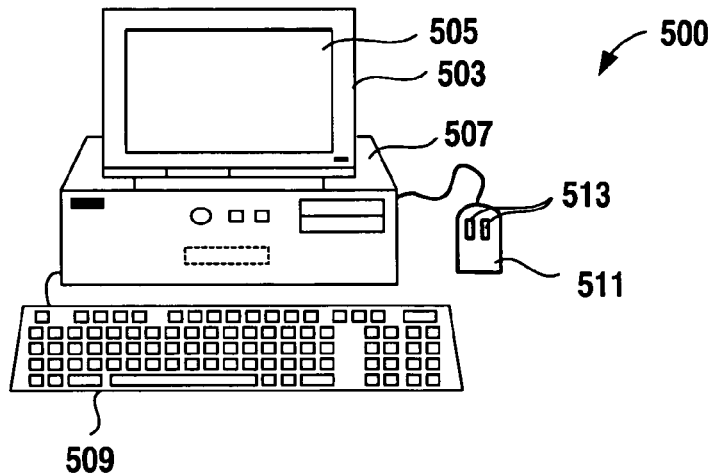
FIG. 5A is a generalized diagram of a typical computer system suitable for use with the present invention.

In FIG. 5A, is an illustration of an embodiment of an exemplary computer system 500 suitable for use with the present invention including display 503 having display screen 505. Cabinet 507 houses standard computer components (not shown) such as a disk drive, CDROM drive, display adapter, network card, random access memory (RAM), central processing unit (CPU), and other components, subsystems and devices. User input devices such as a mouse 511 having buttons 513, and keyboard 509 are shown.

Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 5B:
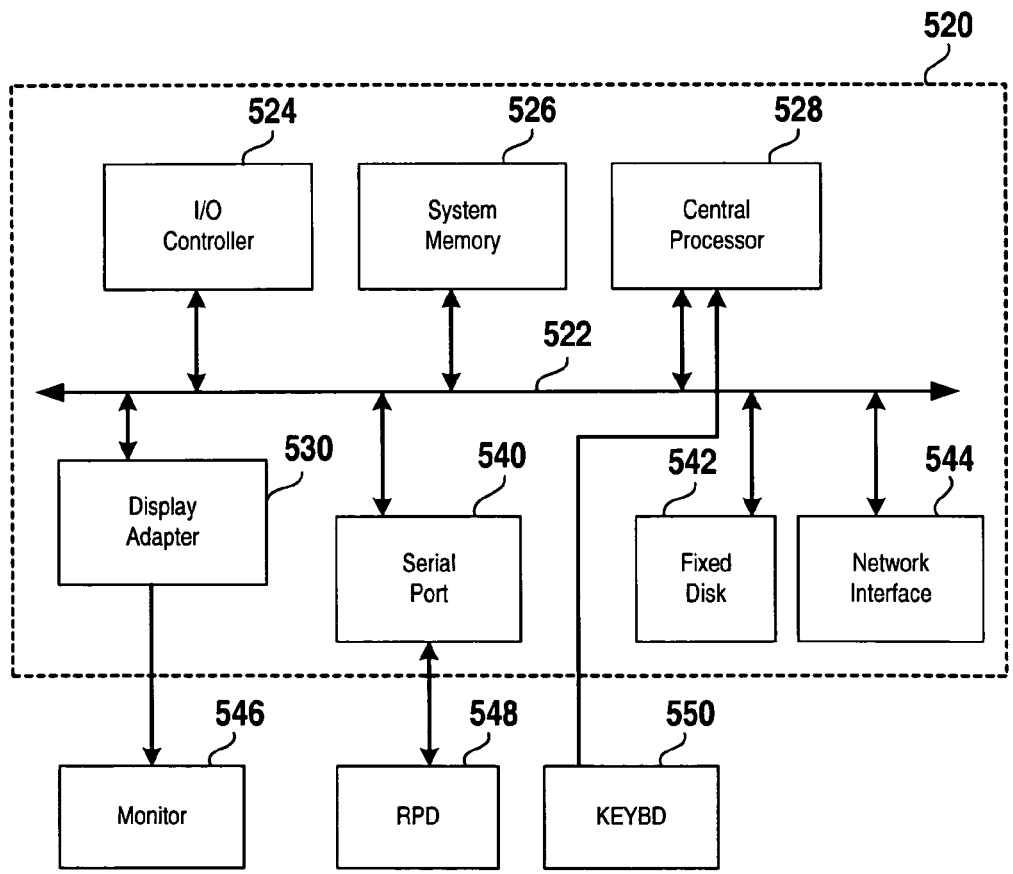
FIG. 5B shows subsystems in the typical computer system of FIG. 5A.

FIG. 5B illustrates subsystems that might typically be found in a computer such as computer 500. In FIG. 5B, subsystems within box 520 are directly interfaced to internal bus 522. Such subsystems typically are contained within the computer system such as within cabinet 507 of FIG. 5A. Subsystems include input/output (I/O) controller 524, System Random Access Memory 9 RAM) 526, Central Processing Unit (CPU) 528, Display Adapter 530, Serial Port 540, Fixed Disk 542 and Network Interface Adapter 544. The use of bus 522 allows each of the subsystems to transfer data among the subsystems and, most importantly, with the CPU. External devices can communicate with the CPU or other subsystems via the bus 522 by interfacing with a subsystem on the bus. Monitor 546 connects to the bus through Display Adapter 530. A relative pointing device (RPD) 548 such as a mouse connects through Serial Port 540. Some devices such as a Keyboard 550 can communicate with the CPU by direct means without using the main data bus as, for example, via an interrupt controller and associated registers (not shown).

As with the external physical configuration shown in FIG. 5A, many subsystem configurations are possible. FIG. 5B is illustrative of but one suitable configuration. Subsystems, components or devices other than those shown in FIG. 5B can be added. A suitable computer system can be achieved without using all of the subsystems shown in FIG. 5B. For example, a standalone computer need not be coupled to a network so Network Interface 544 would not be required. Other subsystems such as a CDROM drive, graphics accelerator, etc. can be included in the configuration without affecting the performance of the system of the present invention.

Figure 5C:
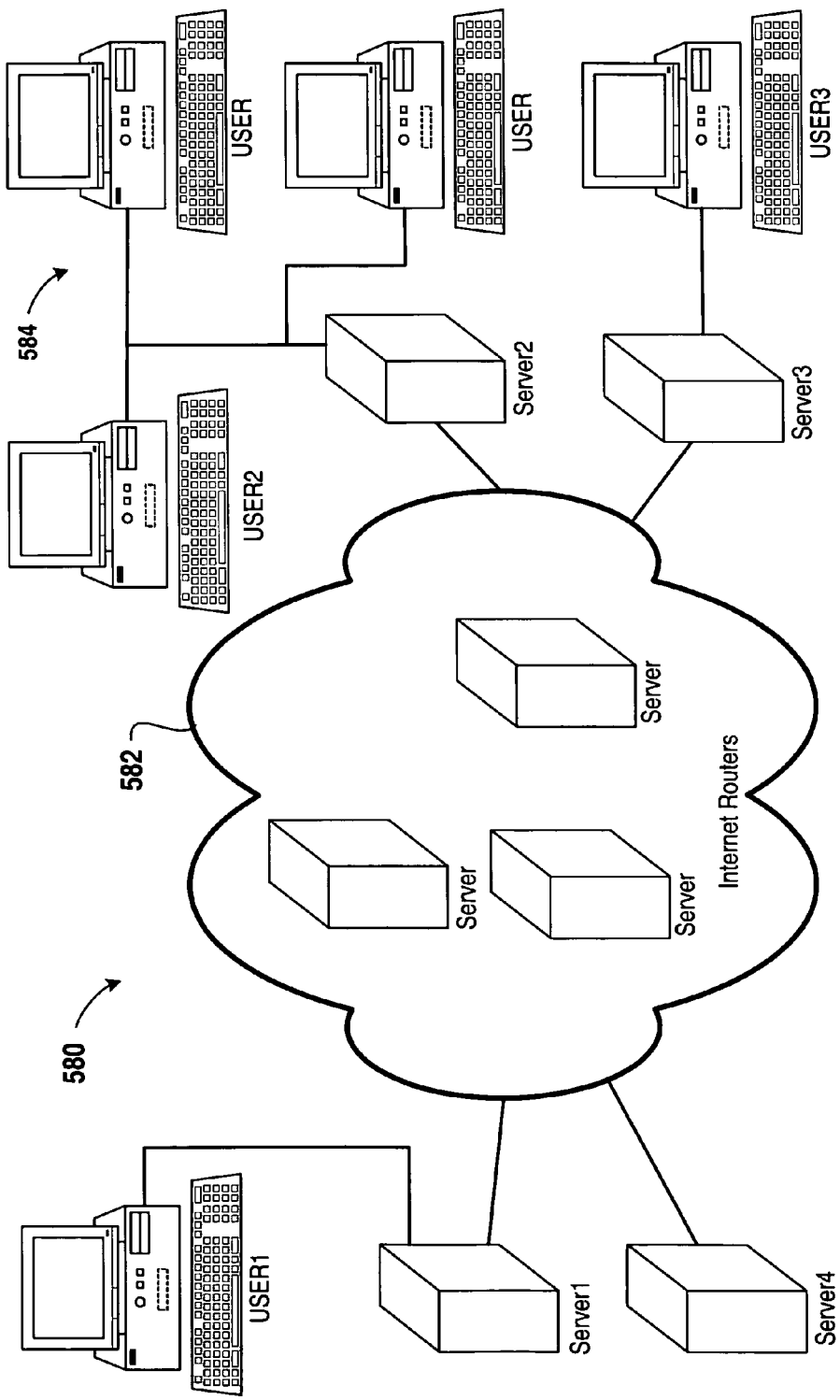
FIG. 5C is a generalized diagram of a typical network suitable for use with the present invention.

FIG. 5C is a generalized diagram of a typical network. In FIG. 5C, the network system 580 includes several local networks coupled to the Internet. Although specific network protocols, physical layers, topologies, and other network properties are presented herein, embodiments of the present invention are suitable for use with any network.

In FIG. 5C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of sever routers 582. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 584 are shown utilizing a local network at a different location from USER1 computer. The computers at 584 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically though of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" or "computer media" for purposes of embodiments of the present invention may be any medium/media that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer system for supporting multiple different operating environments comprising:
    a local zone, provided by a processor of the computer system, configured within a user-space of a native operating system environment; and
    a foreign process, run by the processor, written for an operating system environment, wherein the operating system environment is different from the native operating system environment, and wherein the foreign process is capable of executing on the native operating system environment from within the local zone,
    wherein the local zone is associated with an alternate root directory and a limited device tree, the limited device tree being a subdirectory of the alternate root directory,
    wherein the foreign process is capable of accessing the alternate root directory and the limited device tree during execution, and
    wherein the alternate root directory is separated from the root directory of the native operating system.

2. The system as recited in claim 1, wherein the alternate root directory includes files associated with the operating system environment.

3. The system as recited in claim 1, wherein the limited device tree includes /dev/null, /dev/zero, /dev/ptmx, /dev/pts/*, /dev/tty, /dev/console, dev/random, /dev/urandom, /dev/fd, /dev/zero, /dev/ptmx, and/dev/fd.

4. The system as recited in claim 1, wherein the limited device tree includes Open Sound System (OSS) audio devices.

5. The system as recited in claim 1, wherein the native operating system environment includes a kernel.

6. The system as recited in claim 1, wherein the local zone includes only software associated with the foreign process.

7. The system as recited in claim 1, further comprising:
    a global zone configured within the user-space of the native operating system environment; and
    a native process written for the native operating system environment, wherein the native process is capable of executing on the native operating system environment from within the global zone.

8. The system as recited in claim 7, wherein the local zone is isolated from the global zone.

9. A system for handling system calls between multiple different operating system environments, comprising:
    a handler module, provided by a processor executing code, included in a kernel associated with a native operating system environment, wherein the handler module is capable of receiving a system call from a foreign process or a native process and determining whether the system call is from the foreign process or the native process, and wherein the foreign process is written for an operating system environment that is different from the native operating system environment, and wherein the native process is written for the native operating system environment;
    an emulation library associated with the foreign process and provided by the processor executing code, wherein the emulation library is capable of transforming the system call into a system call recognized by the kernel and passing the system call recognized by the kernel to the kernel;
    a brand kernel module, provided by the processor executing code, associated with the kernel, wherein if the system call is received from the foreign process and the system call requires emulation, the handler module is capable of transferring control to the brand kernel module, wherein the brand kernel module is capable of invoking the emulation library; and
    a local zone, wherein foreign process is capable of executing on the native operating system environment from within the local zone.

10. The system as recited in claim 9, further comprising a global zone, wherein the native process is capable of executing on the native operating system environment from within the global zone.

11. A system for delivering signals between multiple different operating system environments, comprising:
    a first foreign process provided by a central processing unit (CPU) of the system, wherein the first foreign process is capable of generating a first signal and translating the first signal into a second signal, wherein the first signal is recognized by a foreign operating system, and wherein the second signal is recognized by a native operating system;
    a second foreign process provided by the CPU, wherein the second foreign process is capable of receiving the second signal, translating the second signal into a third signal, and sending the third signal to a signal handler module associated with the second foreign process, wherein the third signal is recognized by the foreign operating system; and
    a signal delivery subsystem included in a kernel associated with the native operating system, wherein the signal delivery subsystem is capable of receiving the second signal from the first foreign process and sending second signal to the second foreign process.

12. The system as recited in claim 11, wherein the first foreign process is the same as the second foreign process or the first foreign process is different from the second foreign process.

13. A non-transitory computer-readable storage medium for directing a computer system to support multiple different operating environments, the non-transitory computer-readable medium comprising:
   instructions for configuring a local zone within a user-space of a native operating system environment; and
   instructions for executing a foreign process on the native operating system environment from within the local zone, wherein the foreign process is written for an operating system environment that is different from the native operating system environment.

* * * * *